Jan. 10, 1928.
I. A. DAVIS
1,656,144
DIRECTION SIGNAL FOR MOTOR VEHICLES
Filed Nov. 19, 1926
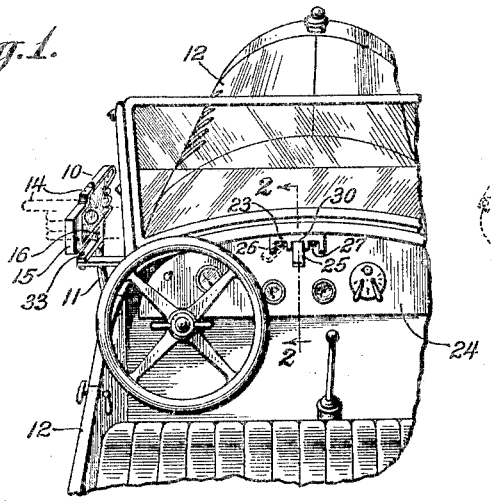
Fig.1.
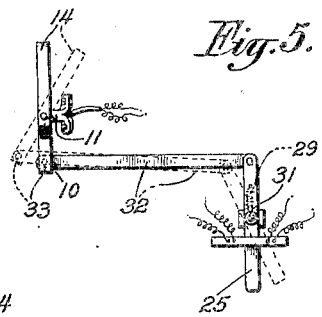
Fig.5.
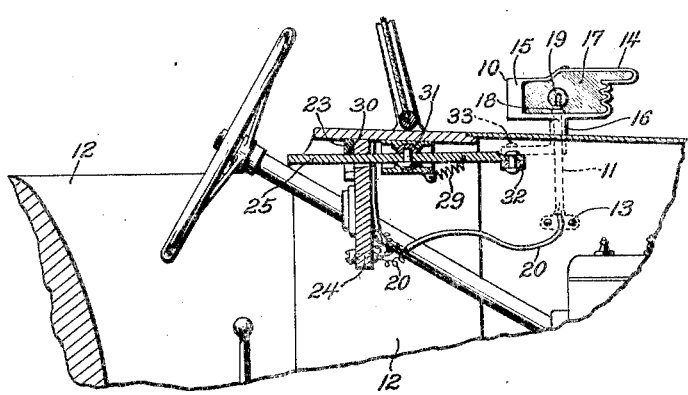
Fig.2.
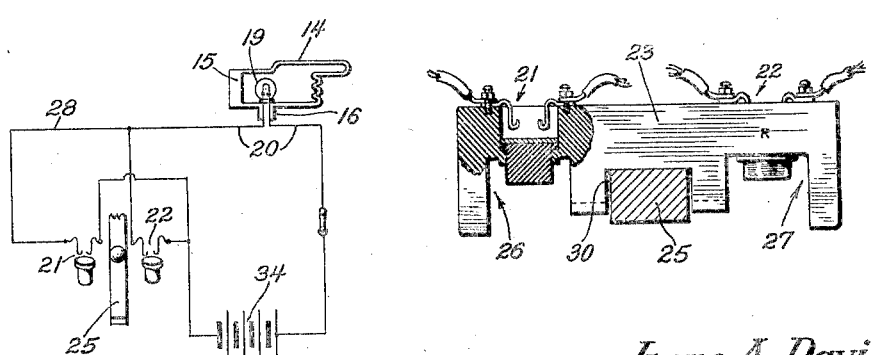
Fig.3.
Fig.4.
Irene A. Davis
INVENTOR
BY Victor J. Evans
ATTORNEY
WITNESS:

Patented Jan. 10, 1928.

1,656,144

UNITED STATES PATENT OFFICE.

IRENE A. DAVIS, OF NEWBURGH, NEW YORK.

DIRECTION SIGNAL FOR MOTOR VEHICLES.

Application filed November 19, 1926. Serial No. 149,423.

This invention relates to improvements in direction signals for motor vehicles.

The primary object of the invention resides in a means for visibly indicating to persons in approaching vehicles, the direction of turn of another vehicle before the driver of the vehicle begins to make the turn, whereby ample warning is given to the drivers of other vehicles and pedestrians of the course to be taken without any misunderstanding.

Another object of the invention is to provide a signal for indicating "right" and "left" turns and which includes a movable hand adapted to attract the attention of a driver of an approaching vehicle when moved from a nonindicating position to an indicating position.

A further object of the invention is to provide a directional indicator which includes a hand mounted on a vertical axis and being normally disposed parallel to the length of the automobile on which it is mounted, so as to be unseen by persons at the front and rear, but which hand may be manually moved to an indicating position at right angle to its normal position to indicate a right or left turn and which is clearly visible from the front and rear.

A still further object of the invention, is to provide an indicating hand which is automatically illuminated so as to be visible at night.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved directional indicator in position upon a motor vehicle and showing the same in an indicating position.

Figure 2 is a verticle sectional view on the line 2—2 of Figure 1.

Figure 3 is a front elevational view of the switch.

Figure 4 is a diagrammatic view of the electric light circuit.

Figure 5 is a top plan view of the signal per se.

Referring more particularly to the drawing, the reference numeral 10 designates my improved direction signal in its entirety and which includes a tubular bracket 11 mounted on the left side of a motor vehicle 12 as at 13, forward of the front seat and which bracket is offset to dispose the indicating hand 14 outward from the side of the vehicle. The indicating hand 14 is turnably mounted on the top end of the bracket by providing the casing 15 of the hand with a sleeve 16, which sleeve fits over the bracket and serves as a vertical axis on which the hand may be turned to either indicating positions or to a neutral position parallel with the length of the vehicle.

The indicating hand 14 as hereinbefore mentioned includes a hollow casing 15 having translucent or red color glass windows 17 on opposite sides thereof and of a shape indicative of a human hand with the index finger in pointing position. The top of the tubular bracket is provided in an electric light socket 18 for supporting an electric light bulb 19 for the purpose of illuminating the hand when in an indicating position. The electric wires 20 from the socket extend through the tubular bracket to electric switches 21 and 22 mounted in a block 23 set in the dash board 24 of the motor vehicle and disposed forward of the driver's seat for respectively lighting the electric light bulb 19 upon movement of the control lever 25 to either of a pair of notches 26 and 27. The switches are in the nature of push buttons and are respectively mounted in the notches 26 and 27 and which close electric circuits 28 as the hand is moved to either a right or left indicating position. The lever 25 is tiltable to disengage it from the notches in order to permit the lever to be set in neutral notch 30 interposed midway between notches 26 and 27.

For actuating the indicating hand 14, I pivotally mount the lever 25 for horizontal and slight vertical movement as at 31, and which lever extends forward beneath the hood of the vehicle, so as to swing on a horizontal plane. The forward end of the lever is pivotally connected to one end of a link 32, while the other end of the link is pivotally connected to the casing of the indicating hand as at 33. The electric circuit receives its source of energy from the storage battery 34 of the motor vehicle and normally the lamp disposed within the indicator is out with the hand parallel to the length of the vehicle. For moving the hand to an indicating position to indicate either a "right" or "left" turn, the free end of the lever 25 is grasped by the hand of an operator and depressed and swung out of the neutral notch 30 and into either of the notches 26 and 27, depending upon the direction of the turn. When a left turn, the lever will be moved into engagement by the notch 26 while the lever will be moved into engagement by the notch 27 for a right turn. Upon moving the lever to the desired notch, the indicator 14 is swung to a point in the direction on the intended turn, and as the lever seats in the selected notch, the spring 29 pushes the lever into engagement with the push button or switch, thereby closing the electric circuit 28 and lighting the lamp within the indicator. The indicator hand is now at right angle to its normal position and may readily be seen from the front and rear by drivers of approaching vehicles. The movement of the hand to an indicating position serves to attract the attention of drivers of approaching vehicles and also pedestrians, thereby forewarning them of the direction of the intended turn. By reason of the electric light within the indicating hand 14, the outline of the hand is clearly visible at night.

What is claimed as new is:—

A directional indicator for motor vehicles comprising an indicating element turnably mounted on a vertical axis, said indicating element being normally disposed in a neutral position parallel to the length of the vehicle on which it is adapted to be mounted, and actuating means for moving said indicating element to positions at right angles to its normal position to indicate "right" and "left" turns of the vehicle, said means including a manipulating lever pivotally mounted between its ends for horizontal swinging and vertical rocking movement, and a link having its ends pivotally connected respectively to one end of said lever and to said indicating element, and means for automatically locking said actuating lever in its set positions upon its manual movement thereto.

In testimony whereof I have affixed my signature.

IRENE A. DAVIS.